(12) United States Patent
Mukoyama et al.

(10) Patent No.: US 12,191,676 B2
(45) Date of Patent: Jan. 7, 2025

(54) POWER RECEIVING DEVICE

(71) Applicant: DENSO CORPORATION, Kariya (JP)

(72) Inventors: Masato Mukoyama, Nisshin (JP);
Masaki Kanesaki, Kariya (JP)

(73) Assignee: DENSO CORPORATION, Kariya (JP)

(*) Notice: Subject to any disclaimer, the term of this patent is extended or adjusted under 35 U.S.C. 154(b) by 506 days.

(21) Appl. No.: 17/409,057

(22) Filed: Aug. 23, 2021

(65) Prior Publication Data

US 2021/0384774 A1     Dec. 9, 2021

Related U.S. Application Data

(63) Continuation of application No. PCT/JP2020/005151, filed on Feb. 10, 2020.

(30) Foreign Application Priority Data

Feb. 22, 2019  (JP) .................................. 2019-031056

(51) Int. Cl.

| | |
|---|---|
| *H02J 50/12* | (2016.01) |
| *B60L 53/122* | (2019.01) |
| *H02J 50/05* | (2016.01) |
| *H02J 50/40* | (2016.01) |
| *H04B 5/79* | (2024.01) |

(52) U.S. Cl.
CPC ............ *H02J 50/12* (2016.02); *B60L 53/122* (2019.02); *H02J 50/05* (2016.02); *H02J 50/40* (2016.02); *H04B 5/79* (2024.01)

(58) Field of Classification Search
CPC .. H02J 50/05; H02J 50/12; H02J 50/40; H02J 7/025; B60L 53/122; H04B 5/0037

USPC .......................... 320/104, 108, 109, 155, 158
See application file for complete search history.

(56) References Cited

U.S. PATENT DOCUMENTS

| | | | | |
|---|---|---|---|---|
| 2009/0079269 A1* | 3/2009 | Jin | ........................ | H02J 50/70 307/104 |
| 2009/0079271 A1* | 3/2009 | Jin | ........................ | H02J 50/12 307/104 |
| 2010/0248622 A1* | 9/2010 | Lyell Kirby | ............ | H02J 50/80 455/127.1 |
| 2012/0262004 A1* | 10/2012 | Cook | ...................... | H02J 50/12 307/104 |

(Continued)

FOREIGN PATENT DOCUMENTS

JP         2008-259419 A       10/2008

*Primary Examiner* — Edward Tso
*Assistant Examiner* — Aaron Piggush
(74) *Attorney, Agent, or Firm* — Oliff PLC

(57) ABSTRACT

A power receiving device receives power from a power transmitting device including a primary coil in a contactless manner and supplies power to a power storage device. The power receiving device includes a secondary coil that receives AC power of a predetermined frequency from the primary coil, a capacitor that is connected to the secondary coil and constitutes a resonant circuit together with the secondary coil, a rectifier circuit that rectifies output power from the resonant circuit, a power conditioning circuit that is provided between the power storage device and the rectifier circuit and includes a switch, and a control device that controls the switch by a predetermined driving frequency. The driving frequency is a frequency obtained by dividing the predetermined frequency of the AC power by a natural number equal to or greater than 2.

4 Claims, 6 Drawing Sheets

(56) References Cited

U.S. PATENT DOCUMENTS

2018/0331576 A1* 11/2018 Kikuchi .................. H02J 50/05

* cited by examiner

POWER RECEIVING DEVICE

CROSS REFERENCE TO RELATED APPLICATION

This application is based on Japanese Patent Application No. 2019-031056, filed Feb. 22, 2019, the contents of which are incorporated herein by reference.

BACKGROUND

Technical Field

The disclosure relates to a power receiving device for receiving AC power from a power transmitting device in a contactless manner.

Related Art

Conventionally, as a contactless power transmission apparatus for transmitting power to the receiving side in a contactless manner without using a power supply cord or a power transmission cable, there has been known one that uses magnetic field resonance or electromagnetic induction. For example, a known power receiving device is installed in a carrier vehicle traveling on a track in a factory or the like, and the power receiving device is fed power from a primary power supply line routed along the travel path of the carrier vehicle.

DESCRIPTION OF SPECIFIC EMBODIMENTS

Figure 1:
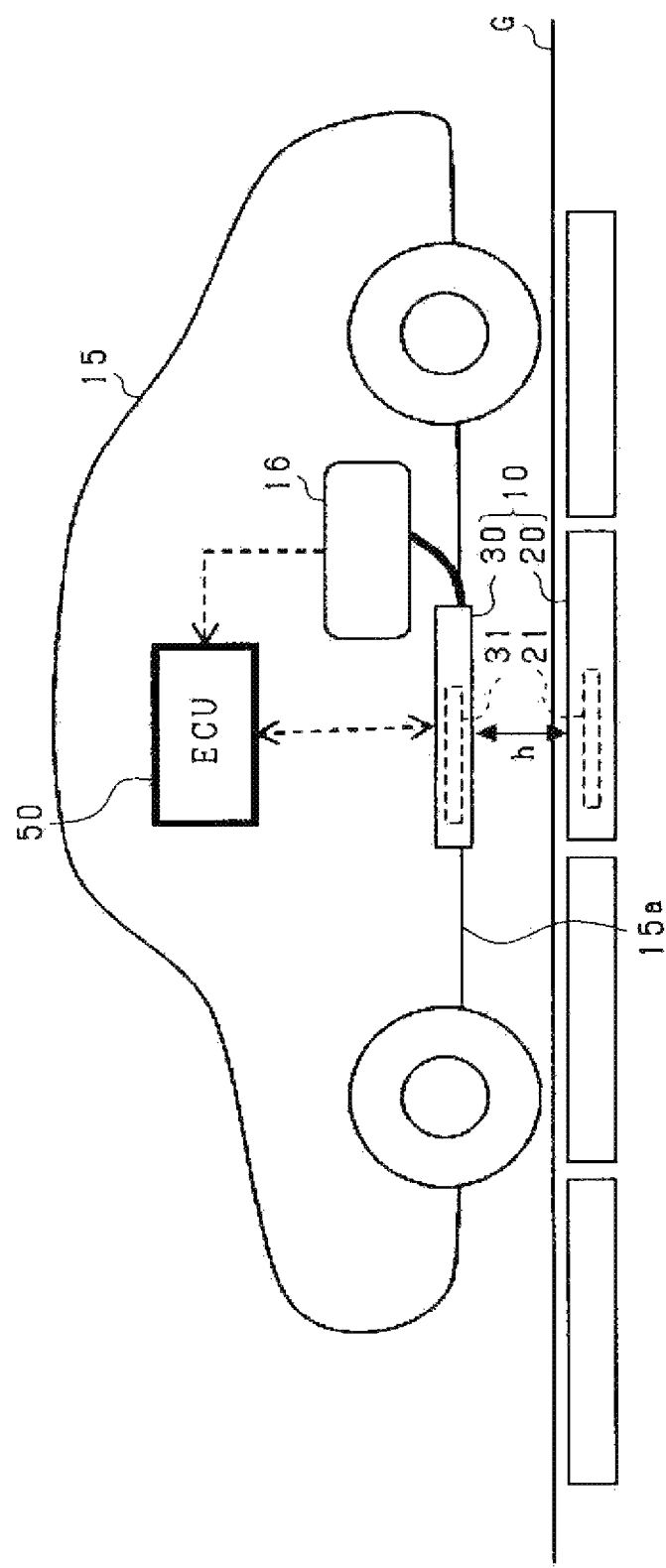
FIG. 1 is a schematic diagram of a contactless power transmission apparatus according to an embodiment.

In the above known power receiving device, as disclosed in JP-A-2008-259419, the supplied power varies in accordance with the load connected to the power receiving device. Therefore, the power receiving device includes a boost chopper circuit as a voltage control means for making the supplied power constant voltage. The on-duty ratio of the switch of the boost chopper circuit is controlled to control the output voltage to the load side.

When a large amount of power is transmitted or received, such as when power is supplied to an automobile in a contactless manner, the switching loss at the time of turning on and off the booster chopper circuit tends to be large. Conventionally, the driving frequency of the switch has been made to coincide with the frequency of the received power, but it is conceivable to lower the driving frequency in order to reduce the switching loss. However, if the driving frequency is different from the frequency of the received power, the output power of the boost chopper circuit may pulsate. Pulsation in the output power is undesirable because deterioration of the load accelerates, or components for preventing pulsation must be added.

In view of the foregoing, it is desired to have a power receiving device capable of suppressing pulsation of output power while reducing loss even when large power is transmitted and received.

One aspect of the present disclosure provides a power receiving device that receives power from a power transmitting device including a primary coil in a contactless manner and supplies power to a power storage device, the power transmitting device including: a secondary coil that receives AC power of a predetermined frequency from the primary coil; a capacitor connected to the secondary coil and constituting a resonant circuit together with the secondary coil; a rectifier circuit that rectifies output power from the resonant circuit; a power conditioning circuit that is disposed between the power storage device and the rectifier circuit and includes a switch; and a control device that controls the switch using a predetermined driving frequency, wherein the driving frequency is a frequency obtained by dividing the predetermined frequency of the AC power by a natural number equal to or greater than 2.

The secondary coil receives AC power of the predetermined frequency from the primary coil. The power supplied to the storage battery is then conditioned by turning on and off the switch of the power conditioning circuit. The driving frequency of the switch is set to a frequency obtained by dividing the predetermined frequency of the received AC power by a natural number equal to or greater than 2. By setting the of the driving frequency to a frequency obtained by dividing the predetermined frequency of the AC power by a natural number, the power input to the power conditioning circuit can always be switched in the same phase, and pulsation of the power supplied to the power storage device can be suppressed. By using a natural number N equal to or greater than 2, the driving frequency can be lowered, and switching loss can be reduced.

Embodiments

The present embodiment is directed to a power receiving device mounted on a vehicle. FIG. 1 is a schematic configuration diagram of a contactless power transmission apparatus 10 according to the present embodiment. A vehicle 15 is, for example, an automobile driven by an electric vehicle drive device (drive motor or the like), such as an electric vehicle (EV) or a plug-in hybrid vehicle (PEV).

Power transmitting devices 20 perform, in a contactless state, power transmission (power supply) to a power receiving device 30 mounted on the vehicle 15. The power transmitting devices 20 are installed on the ground G so as to be buried in the ground G or exposed from the ground G. The power transmitting devices 20 are installed, for example, in a road traveled by the vehicle 15, and are buried in multiple rows along the traveling direction of the vehicle 15. The power transmitting devices 20 transmit power while the vehicle 15 is traveling.

The power transmitting devices 20 each includes a primary coil 21. The primary coil 21 is formed by winding a wire (for example, a litz wire) around a core, such as a ferrite core, in a planar shape, for example. The primary coil 21 is disposed such that its axis is orthogonal to the ground G, that is, the flat face of the wound primary coil 21 having a planar shape is parallel to the ground G.

The power receiving device 30 includes a secondary coil 31, and the secondary coil 31 is attached to the vehicle body. More specifically, the secondary coil 31 is disposed on the vehicle bottom 15a. The vehicle bottom 15a is a portion forming the lower face of the vehicle 15, such as the floor, the under cover, and the like that defines the compartment of the vehicle 15.

The secondary coil 31 is formed by winding a wire (for example, a litz wire) around a core, such as a ferrite core, in a planar shape, for example. The secondary coil 31 is disposed such that its axis is orthogonal to the ground G, that is, the flat face of the wound secondary coil 31 having a planar shape is parallel to the ground G and faces parallel to the primary coil 21.

The power received by the power receiving device 30 is supplied to a storage battery 16. The storage battery 16 is, for example, a secondary battery (a lithium-ion battery, a nickel-metal hydride secondary battery, or the like). The storage battery 16 stores the power supplied from the power receiving device 30 and supplies the power to the vehicle drive device. Note that the storage battery 16 corresponds to a "power storage device."

The power receiving device 30 is provided with an ECU 50 that is a control device for controlling the power receiving device 30. The ECU 50 is an electronic control device including a microcomputer including a CPU, a ROM, a RAM, etc., and a peripheral circuit thereof. The ECU 50 receives the monitoring state of the SOC or the like of the storage battery 16. Note that the ECU 50 may be disposed at the same position as the secondary coil 31 or the like, or the ECU 50 may be disposed at another position on the vehicle 15.

Figure 2:
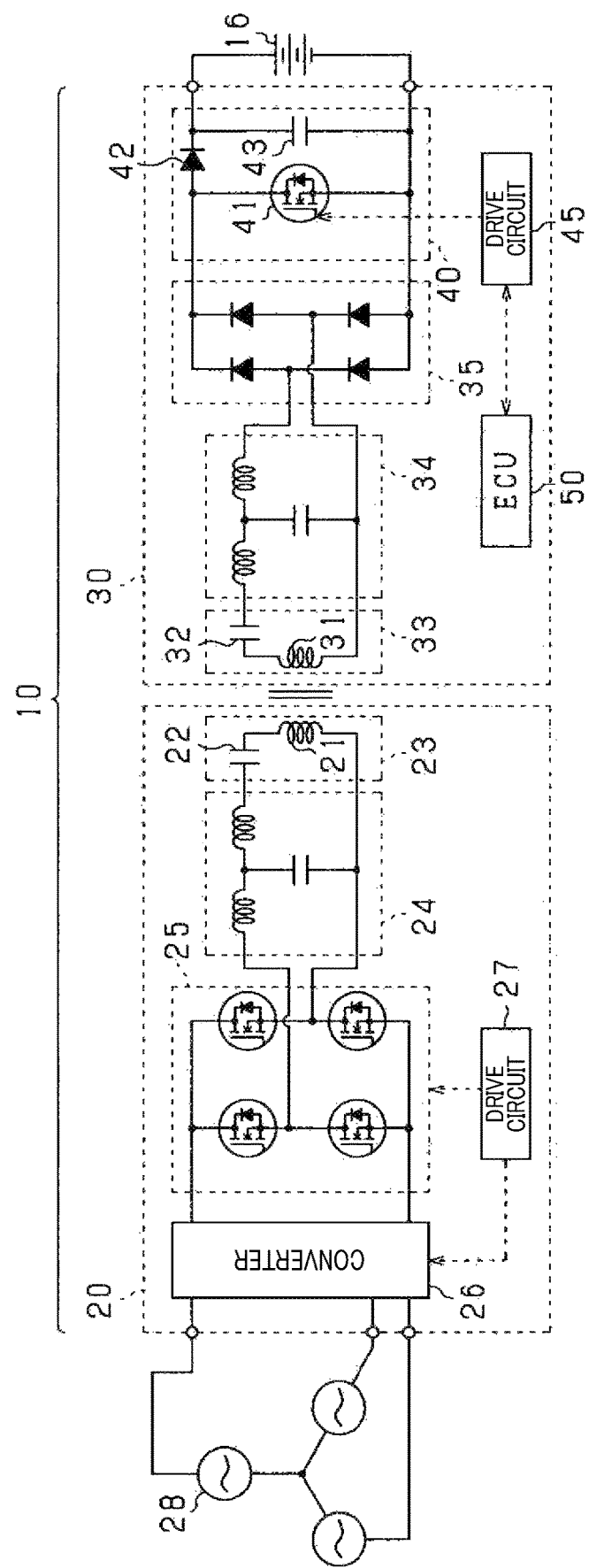
FIG. 2 is an electrical circuit diagram of the contactless power transmission apparatus.

FIG. 2 is an electrical circuit diagram of the contactless power transmission apparatus 10. The contactless power transmission apparatus 10 includes a power transmitting device 20 and a power receiving device 30. The power transmitting device 20 includes a power-transmission-side resonator 23, a power-transmission-side filter circuit 24, an inverter 25, a converter 26, and a power-transmission-side drive circuit 27.

The power transmitting device 20 receives power from a power supply unit 28. The power supply unit 28 is an AC power supply that receives power from a power network provided by an electric power company or the like. The power supply unit 28 supplies AC power of approximately 50 kHz at 3-phase 200 V or 400 V, for example.

The converter 26 is an AC-to-DC converter that converts the AC power supplied from the power supply unit 28 into DC power of predetermined voltage, and converts the AC power into DC power through, for example, a switching method. A switch of the converter 26 is driven by the power-transmission-side drive circuit 27.

The inverter 25 converts the DC power supplied from the converter 26 into AC power having a predetermined frequency f0. The inverter 25 converts the DC current into AC current having a predetermined frequency f0 by switching the switch. The switch of the inverter 25 is driven by the power-transmission-side drive circuit 27.

It is desirable that the power-transmission-side filter circuit 24 be provided between the inverter 25 and the power-transmission-side resonator 23. The power-transmission-side filter circuit 24 is a type of low-pass filter that cuts high-frequency components. In the power-transmission-side filter circuit 24, a coil, a capacitor, and a coil are connected in a T-shape and act as an immittance filter.

The power-transmission-side resonator 23 is a resonant circuit connected in series to the primary coil 21 and a power-transmission-side capacitor 22. When the power-transmission-side resonator 23 resonates with the input AC power having the predetermined frequency f0, the power-transmission-side resonator 23 transmits the power to a power-reception-side resonator 33.

The power receiving device 30 includes the power-reception-side resonator 33, a power-reception-side filter circuit 34, a rectifier circuit 35, a power conditioning circuit 40, and the ECU 50. The power receiving device 30 supplies power to the storage battery 16.

The power-reception-side resonator 33 is a resonant circuit connected in series to the secondary coil 31 and a power-reception-side capacitor 32. It is desirable that the power-transmission-side resonator 23 and the power-reception-side resonator 33 be configured by a series-series (S-S) system. The power-reception-side resonator 33 is conditioned so as to establish magnetic field resonance with the power-transmission-side resonator 23. Specifically, it is desirable that the resonant frequency of the power-reception-side resonator 33 coincide with the resonant frequency of the power-transmission-side resonator 23.

When AC power having the predetermined frequency f0 is input from the inverter 25 in a state in which the power transmitting device 20 and the power receiving device 30 are relatively positioned such that magnetic field resonance is established, the power-transmission-side resonator 23 (the primary coil 21) and the power-reception-side resonator 33 (the secondary coil 31) establish magnetic-field resonance. Consequently, the power-reception-side resonator 33 receives AC power from the power-transmission-side resonator 23. Note that the predetermined frequency f0 of the AC power input from the inverter 25 is preferably a frequency that allows power transmission between the power-transmission-side resonator 23 and the power-reception-side resonator 33. Specifically, it is desirable that the predetermined frequency f0 of the AC power generated by the inverter 25 be set to the resonant frequency of the power-transmission-side resonator 23 and the power-reception-side resonator 33.

The power-reception-side filter circuit 34 is disposed between the power-reception-side resonator 33 and the rectifier circuit 35. The power-reception-side filter circuit 34 has the same configuration as that of the power-transmission-side filter circuit 24. The power-reception-side filter circuit 34 is a type of low-pass filter that cuts high-frequency components. In the power-reception-side filter circuit 34, a coil, a capacitor, and a coil are connected in a T-shape.

By designing the resonant frequency of the power-reception-side filter circuit 34 based on the predetermined frequency f0, the power-reception-side filter circuit 34 acts as an immittance filter. The immittance filter (the power-reception-side filter circuit 34) is an impedance-to-admittance converter, and is configured so that the impedance in view from the input end of the immittance filter is proportional to the admittance of the load connected to the output end. In the case where the power input to the immittance filter (the power-reception-side filter circuit 34) is constant voltage, the power output from the immittance filter is converted into constant current.

The rectifier circuit 35 has a known configuration for converting AC power into DC power. The rectifier circuit 35 is composed of, for example, a diode bridge circuit consisting of four diodes. The power output from the rectifier circuit 35 is the power obtained through full-wave rectification of the AC power.

The output power from the rectifier circuit 35 is input to the power conditioning circuit 40 for conditioning the power supplied to the storage battery 16. The power conditioning circuit 40 includes a switch 41, a diode 42, and a capacitor 43. The power conditioning circuit 40 is a chopper circuit that can energize the storage battery 16 from the secondary coil 31 side by turning off the switch 41. The switch 41 is a semiconductor switching element, such as a MOSFET, and is driven by a power-reception-side drive circuit 45. The switch 41 is turned on and off to condition the power level flowing toward the storage battery 16. The voltage output from the power conditioning circuit 40 depends on the battery voltage of the storage battery 16.

The power-reception-side drive circuit 45 performs on-off control of the switch 41 at a driving frequency f1 on the basis of a command from the ECU 50. The switch 41 is controlled by PWM control in which the time of the on-state is controlled predetermined periods, and the output power is conditioned by controlling the on time (on-duty) of the switch 41 in constant periods.

When a large amount of power is received, such as when power is supplied from the power transmitting device 20 to the power receiving device 30 of the vehicle 15, and the power to be supplied to PW the storage battery 16 is conditioned by the power conditioning circuit 40, the switching loss at the time of turning on and off the switch 41 tends to be large. Conventionally, the driving frequency of the switch 41 has been made to coincide with the frequency of the received power, but it is conceivable to lower the driving frequency of the switch 41 in order to reduce the switching loss.

Figure 3:
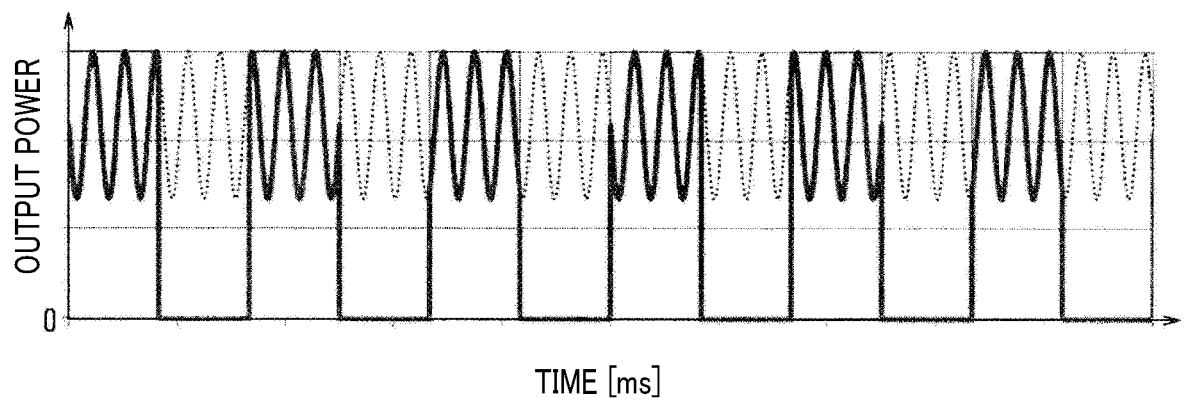
FIG. 3 is a diagram illustrating the relationship between the output power and the driving frequency of a rectifier circuit in a comparative example.

FIG. 3 is a diagram illustrating an example of the power output from the rectifier circuit 35 when the driving frequency is set not according to the present embodiment. The dashed line in FIG. 3 indicates the output power from the rectifier circuit 35 that is obtained by superimposing a frequency component of 170 kHz, which is f0×2, on a predetermined DC power when the predetermined frequency f0 is, for example, 85 kHz. The solid line in FIG. 3 indicates the output passing through the switch 41 when the switch 41 is turned on and off at the driving frequency in the comparative example, for example, 30 kHz. Note that, the output waveform of the rectifier circuit 35, which performs full-wave rectification, has a frequency component of twice the predetermined frequency f0 or f0×2. The rectifier circuit may be a half-wave rectifier circuit, and in such a case, the output waveform from the rectifier circuit has a frequency component of the predetermined frequency f0.

Figure 4:
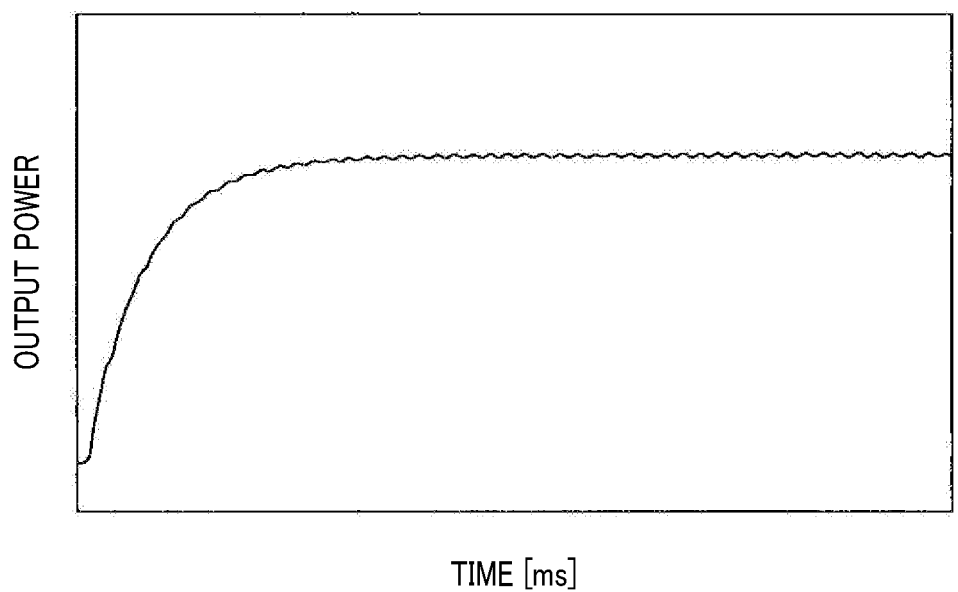
FIG. 4 is a diagram illustrating the waveform of the output power to a storage battery in the comparative example.

When switching is performed at a frequency unrelated to the predetermined frequency f0 as in the driving frequency of the comparative example, the output phase of the rectifier circuit 35 at the switching timing will be different each time, and the output power will also be different for each switching. Therefore, the output power of the power conditioning circuit 40 pulsates, as illustrated in FIG. 4. FIG. 4 is a diagram illustrating the waveform of the output power from the power conditioning circuit 40 to the storage battery 16 in the comparative example. In the comparative example, pulsation constantly occurs. Such pulsation occurring in the power supplied to the storage battery 16 is undesirable because deterioration of the storage battery 16 is accelerated, and components for the purpose of pulsation prevention must be added.

Figure 5:
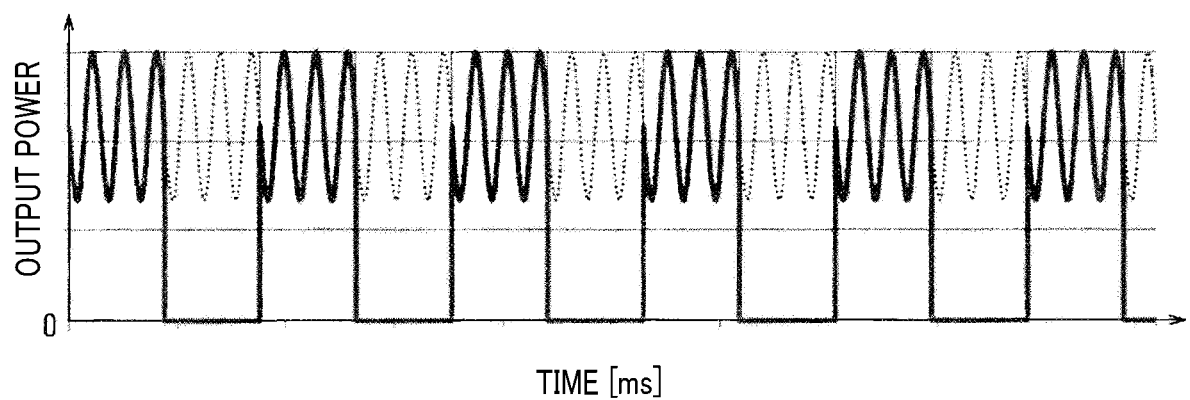
FIG. 5 is a diagram illustrating the relationship between the output power and the driving frequency of a rectifier circuit according to an embodiment.

Therefore, in the present embodiment, the driving frequency f1 of the switch 41 is made to be a frequency obtained by dividing the predetermined frequency f0 of the received AC power by a natural number N equal to or greater than two. FIG. 5 is a diagram illustrating the relationship between the output power of the rectifier circuit 35 and the driving frequency f1 in the present embodiment. The dashed line in FIG. 5 indicates the output power from the rectifier circuit 35 that is obtained by superimposing a frequency component of a predetermined frequency f0×2, for example, 170 kHz, on a predetermined DC power. The solid line in FIG. 5 indicates the output passing through the switch 41 when the switch 41 is turned on and off at the driving frequency f1 in the present embodiment, for example, 28.33 kHz, which is obtained by dividing the predetermined frequency f0 (85 kHz) by 3.

Figure 6:
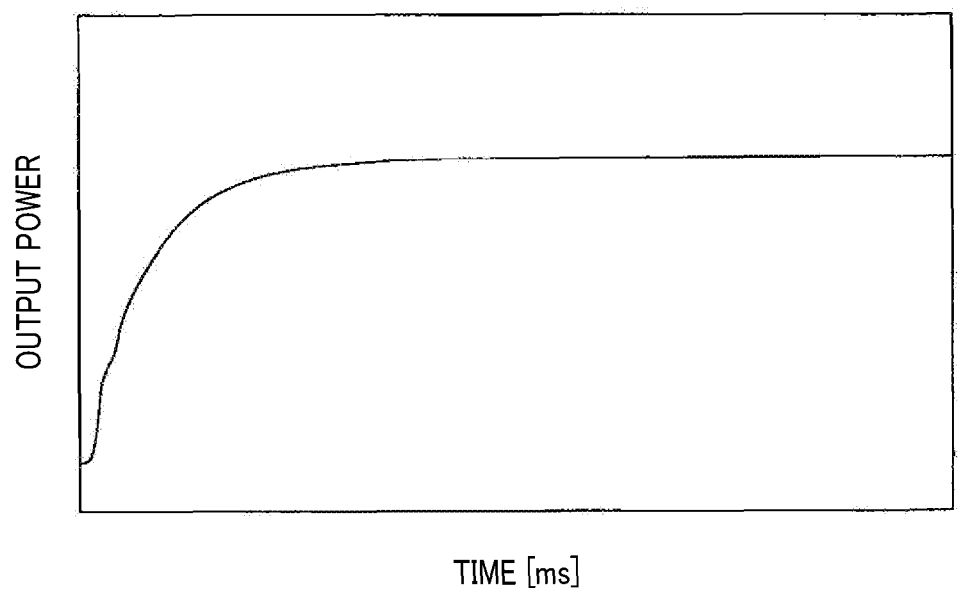
FIG. 6 is a diagram illustrating the waveform of the output power to a storage battery in an embodiment.

When switching is performed at the driving frequency f1 obtained by dividing the predetermined frequency f0 by a natural number N, as the driving frequency f1 in the present embodiment, the output phase of the rectifier circuit 35 at the switching timing is the same every time, and the output power is also the same every time. Therefore, the switching loss can be reduced without pulsation occurring in the output power of the power conditioning circuit 40. FIG. 6 is a diagram illustrating the waveform of the output power from the power conditioning circuit 40 to the storage battery 16 in the present embodiment. In the present embodiment, pulsation does not occur. Also, the switching loss can be suppressed to about ⅓ in comparison with that in the case where the driving frequency is set to the same value as the predetermined frequency f0 as in the past.

Note that in the present embodiment, an inductor for energy storage is not provided between the switch 41 of the power conditioning circuit 40 and the rectifier circuit 35, and thus no loss is caused by lowering the driving frequency f1. The power conditioning circuit 40 according to the present embodiment is a so-called boost chopper circuit that does not include an inductor for energy storage. When a boost chopper circuit is used, the power input to the switch 41 must be constant current, but since the input power is generally constant voltage, an inductor is provided in front of the switch 41. However, when an inductor is provided in front of the switch 41, loss occurs in the inductor as a result of a decrease in the driving frequency f1.

In order to further reduce loss, it is desirable that the power conditioning circuit 40 does not include an inductor. Accordingly, in the present embodiment, the power-transmission-side resonator 23 and the power-reception-side resonator 33 are configured by an S-S system, and the power-reception-side filter circuit 34 acting as an immittance filter is provided so that constant current is output from the rectifier circuit 35. Therefore, it is not necessary to provide an inductor for energy storage between the switch 41 of the power conditioning circuit 40 and the rectifier circuit 35, and no inductor is provided between the switch 41 and the rectifier circuit 35. Consequently, no loss occurs in the inductor due to the lowering of the driving frequency f1 of the switch 41, and the loss can be further suppressed by lowering the driving frequency f1.

By lowing the driving frequency f1 of the switch 41, the switching loss can be reduced, but the controllability of the fluctuation of the received AC power is lowered. In particular, when contactless power supply is performed while the vehicle 15 is traveling, the received power fluctuates due to various factors. A drop in controllability is undesirable because a drop in controllability leads to fluctuation in power supplied to the storage battery 16 due to fluctuation in the received power.

Accordingly, the driving frequency f1 of the switch 41 is set to a frequency obtained by dividing the predetermined frequency f0 by a natural number N within the range of 2 to 10. Preferably, the natural number N is within the range of 2 to 5. In this range, the controllability of the power conditioning by the power conditioning circuit 40 can be maintained while the switching loss is reduced.

In order to calculate the driving frequency f1, the natural number N dividing the predetermined frequency f0 may be variable. In some cases, it may not be necessary to increase the controllability of the switch 41. For example, when the fluctuation of the received power is small, such as when the vehicle 15 is stopped or when the fluctuation of the output from the storage battery 16 is small, the controllability does not have to be increased. Accordingly, when the fluctuation of the received power in the secondary coil 31 is small, the natural number N is made larger than that of when the fluctuation of the received power is large.

Figure 7:
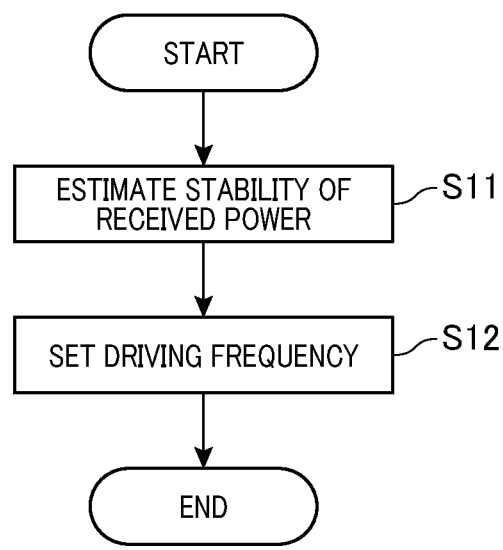
FIG. 7 is a flowchart of a process performed by a control device.

FIG. 7 is a flowchart for setting a driving frequency f1 when the driving frequency f1 is variable. This process is performed by the ECU 50 in predetermined cycles.

In step S11, the stability of the received power in the secondary coil 31 is estimated. The received power fluctuates when the distance between the primary coil 21 and the secondary coil 31 changes, for example, due to a change in the vehicle height or the like while the vehicle 15 is traveling. The received power also fluctuates when the SOC of the storage battery 16 changes. The SOC of the storage battery 16 is likely to change while the vehicle 15 is traveling, particularly while accelerating. Accordingly, the stability of the received power is estimated on the basis of the traveling state, etc., of the vehicle 15. For example, in a state where the speed change of the vehicle 15 is large, the fluctuation of the received power is estimated to be large and the stability is estimated to be small, while in a state where the speed change of the vehicle 15 is small or in a state where the vehicle is stopped, the fluctuation of the received power is estimated to be small and the stability is estimated to be large. More specifically, if the vehicle speed change rate (i.e., acceleration) is equal to or greater than a predetermined value, the stability is estimated to be small, and if it is equal to or less than the predetermined value, the stability is determined to be large.

In step S12, the driving frequency f1 is set on the basis of the stability of the received power. If the fluctuation of the received power is estimated to be small, the natural number N for dividing the predetermined frequency f0 is increased. For example, the driving frequency f1 is decreased to a value obtained by dividing the predetermined frequency f0 by 5. On the other hand, if the fluctuation of the received power is estimated to be large, the natural number N for dividing the predetermined frequency f0 is decreased. For example, the driving frequency f1 is increased to a value obtained by dividing the predetermined frequency f0 by 2. The power-reception-side drive circuit 45 is then controlled by the calculated driving frequency f1. Consequently, if the controllability does not need to be improved, switching loss can be further suppressed by lowering the driving frequency f1.

In the above-described embodiment, the following effects are achieved.

The secondary coil 31 receives AC power of the predetermined frequency f0 from the primary coil 21. The power supplied to the storage battery 16 is then conditioned by turning on and off the switch 41 of the power conditioning circuit 40. The driving frequency f1 of the switch 41 is then set to a frequency obtained by dividing the predetermined frequency f0 of the received AC power by a natural number N equal to or greater than 2. By setting the driving frequency f1 to the frequency obtained by dividing the predetermined frequency f0 of the AC power by the natural number N, the power input to the power conditioning circuit 40 can always be switched in the same phase, and pulsation of the power supplied to the storage battery 16 can be suppressed. By using a natural number N equal to or greater than 2, the driving frequency f1 can be lowered, and switching loss can be reduced.

By lowing the driving frequency f1 of the switch 41, the switching loss can be reduced, but the controllability of the fluctuation of the AC power received by the secondary coil 31 is lowered. Lowering of the controllability is particularly undesirable when contactless power supply is performed while the vehicle 15 is traveling because the received power fluctuates due to various factors. Therefore, the driving frequency f1 of the switch 41 is set to a frequency obtained by dividing the predetermined frequency f0 of the AC power received by the secondary coil 31 by a natural number N within the range of 2 to 10. Consequently, controllability can be maintained while switching loss is reduced.

In the present embodiment, a chopper circuit is used as the power conditioning circuit 40. For example, in the case where a boost chopper circuit is used, the input power must be constant current, but usually the input power is constant voltage. Therefore, power is conditioned by providing an inductor between the boost chopper circuit and the switch 41 to store the energy of the input power. However, in the case where an inductor is provided in the power conditioning circuit 40, lowering of the driving frequency f1 of the switch 41 causes loss in the inductor.

Accordingly, in the present embodiment, the power-transmission-side resonator 23 and the power-reception-side resonator 33 are configured by an S-S system, and the power-reception-side filter circuit 34 acting as an immittance filter is provided so that constant current is output from the rectifier circuit 35. An inductor for energy storage is not provided between the rectifier circuit 35 and the switch 41. Consequently, no loss occurs in the inductor due to the lowering of the driving frequency f1 of the switch 41, and the loss can be further suppressed by lowering the driving frequency f1.

The driving frequency f1 relates to the controllability of the power supplied to the storage battery 16, but in some cases, there is no need to increase the controllability of the power supplied to the storage battery 16. For example, when the fluctuation of the received power is small, such as when the vehicle 15 is stopped or when the fluctuation of the output from the storage battery 16 is small, the controllability does not have to be increased. Accordingly, when the natural number N, i.e., the driving frequency f1, is variable, and the fluctuation of the received power in the secondary coil 31 is small, the natural number N for division is made larger than that of when the fluctuation of the received power is large. That is, when the fluctuation in the received power is small in the secondary coil 31, the driving frequency f1 of the switch 41 is lowered. Consequently, when it is not necessary to increase controllability, loss can be further suppressed by lowering the driving frequency f1.

Other Embodiments

The disclosure is not limited to the above-described embodiment, and, for example, may be implemented as follows.

Figure 8:
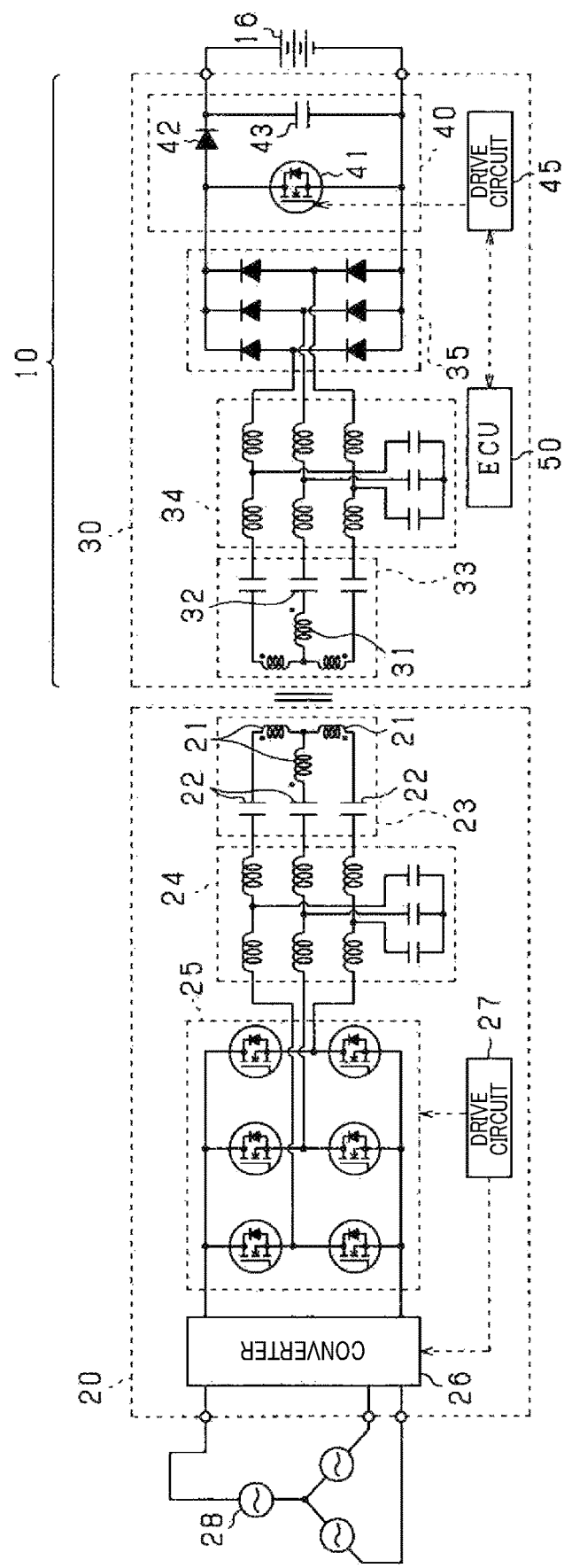
FIG. 8 is an electrical circuit diagram of a contactless power transmission apparatus according to another embodiment.

The primary coil 21 and the secondary coil 31 may be multi-phased. For example, the primary coil 21 and the secondary coil 31 may be multi-phased into three phases, as illustrated in FIG. 8. When the primary coil 21 and the secondary coil 31 are multi-phased, the inverter 25, the power-transmission-side filter circuit 24, the power-reception-side filter circuit 34, and the rectifier circuit 35 are also multi-phased in accordance with the number of phases.

The configuration of the power conditioning circuit 40 for conditioning the output from the rectifier circuit 35 is the same even in the case of multi-phase power. Note that in the case of three-phase power, the output power from the rectifier circuit 35 has a frequency component of the predetermined frequency f0×3 in the predetermined DC power. In such a case, also, the driving frequency f1 of the switch 41 can be set to a value obtained by dividing the predetermined frequency f0 by a natural number N, to switch the power input to the power conditioning circuit 40 always in the same phase, and reduce switching loss while pulsation is suppressed.

The ECU 50 or microcomputer may detect the frequency of the AC power received by the secondary coil 31, and the driving frequency f1 may be controlled to a value obtained by dividing the detected frequency by a natural number N equal to or greater than 2. In general, the frequency on the transmission side is maintained constant by the inverter 25. However, in rare cases, unexpected fluctuation may occur in the frequency of the AC power generated by the inverter 25, or the frequency of the AC power generated by the inverter 25 may not be known in advance. Therefore, a frequency counter function is provided by the ECU 50, the microcomputer, or the like, and the frequency of the received AC power is detected. By detecting the frequency of the received AC power and setting the driving frequency f1 on the basis of the detected frequency, loss can be reduced while pulsation is suppressed.

An immittance for energy storage may be provided between the rectifier circuit 35 and the switch 41. When the driving frequency f1 is lowered, loss occurs in the immittance, but such loss is smaller than switching loss. Even if an immittance is provided between the rectifier circuit 35 and the switch 41, losses in the power receiving device 30 can be reduced.

The power receiving device 30 may be provided on the side of the vehicle 15. In such a case, the power transmitting device 20 may be embedded in a guard rail or the like disposed on the side of the road.

While the disclosure has been described in accordance with the embodiments, it is understood that the disclosure is not limited to such embodiments or structures. The disclosure also encompasses various modifications and variations within the scope of equality. Furthermore, various combinations and modes, as well as other combinations and modes including only one element, more or less, thereof, are also within the scope and idea of the disclosure.

What is claimed is:

1. A power receiving device that receives power from a power transmitting device including a primary coil in a contactless manner and supplies power to a power storage device, the power receiving device comprising:
   a secondary coil that receives AC power from the primary coil;
   a capacitor connected to the secondary coil and constituting a resonant circuit together with the secondary coil;
   a rectifier circuit that rectifies output power from the resonant circuit;
   a power conditioning circuit that is disposed between the power storage device and the rectifier circuit and includes a switch; and
   a control device that:
      controls the switch using a driving frequency that is set based on the stability of the AC power received by the secondary coil,
      wherein the driving frequency is obtained by dividing the frequency of the AC power by a natural number equal to or greater than 2;
      estimates the stability of the AC power received by the secondary coil based on a determination of whether fluctuation of the power received by the secondary coil satisfies a threshold;
      varies the natural number based on the determination, wherein
      when the power received by the secondary coil satisfies the threshold, the natural number is increased, and
      when the power received by the secondary coil does not satisfy the threshold, the natural number is decreased; and
      sets the driving frequency based on the estimated stability of the AC power received by the secondary coil.

2. The power receiving device according to claim 1, wherein the natural number is a number within a range of 2 to 10.

3. The power receiving device according to claim 1, wherein,
   constant current is output from the rectifier circuit, and
   the power conditioning circuit is a chopper circuit and has no inductor between the rectifier circuit and the switch.

4. The power receiving device according to claim 1, wherein the control device detects the frequency of the AC power and controls the driving frequency to a value obtained by dividing the detected frequency by a natural number equal to or greater than 2.

* * * * *